Oct. 20, 1931.    C. B. CLARK    1,828,318
BURNER FOR THE OXIDATION OF AMMONIA
Filed Feb. 20, 1930    3 Sheets-Sheet 1
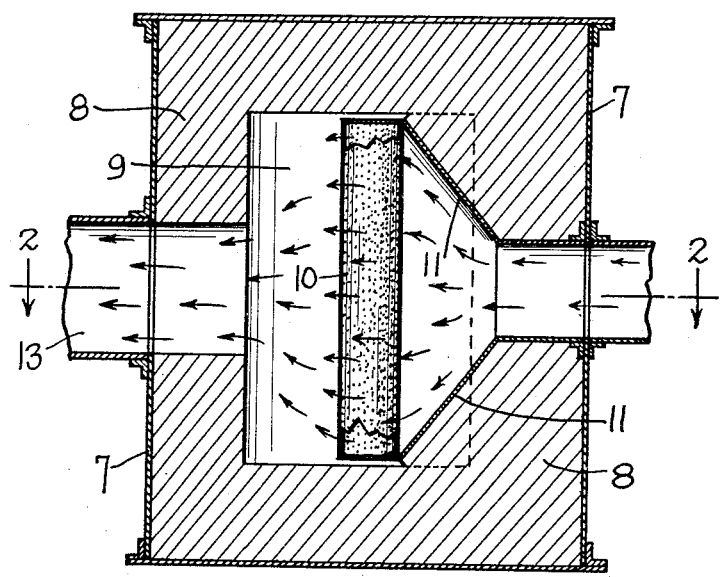
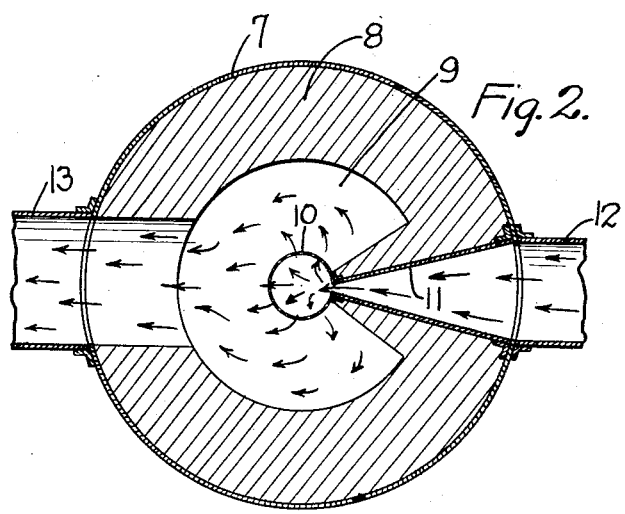
Inventor
CYRIL B. CLARK
By His Attorney
Philip Clark Oct. 20, 1931.  C. B. CLARK  1,828,318
BURNER FOR THE OXIDATION OF AMMONIA
Filed Feb. 20, 1930   3 Sheets-Sheet 2
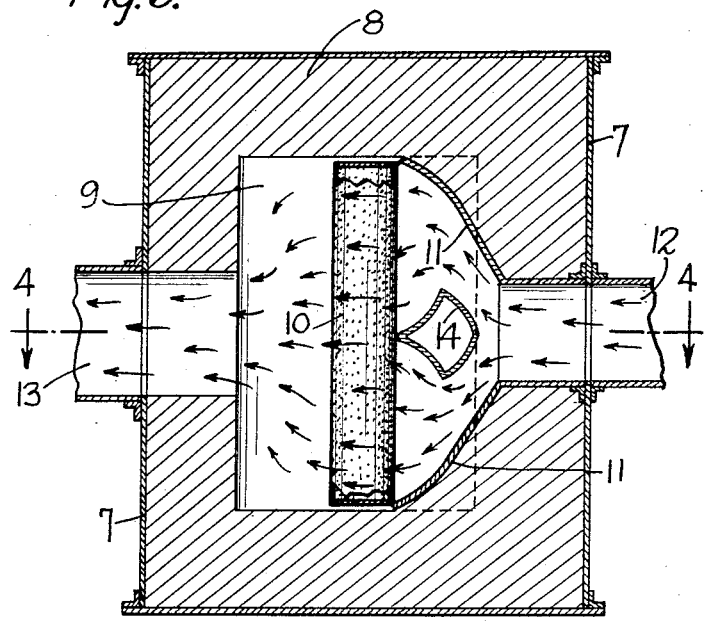
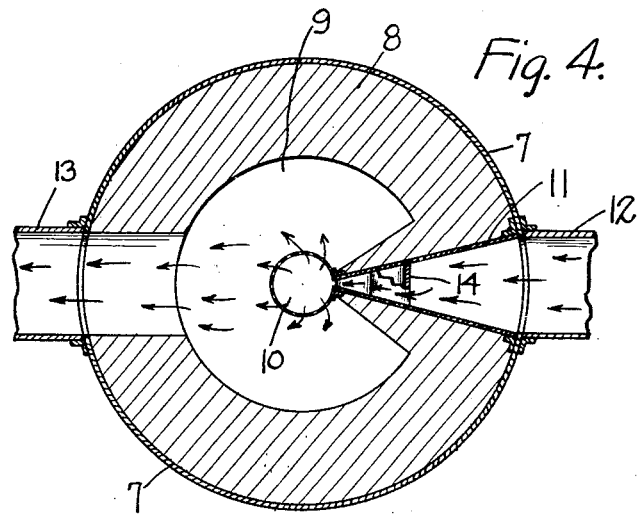
Inventor
CYRIL B. CLARK
By His Attorney Oct. 20, 1931.   C. B. CLARK   1,828,318
BURNER FOR THE OXIDATION OF AMMONIA
Filed Feb. 20, 1930   3 Sheets-Sheet 3
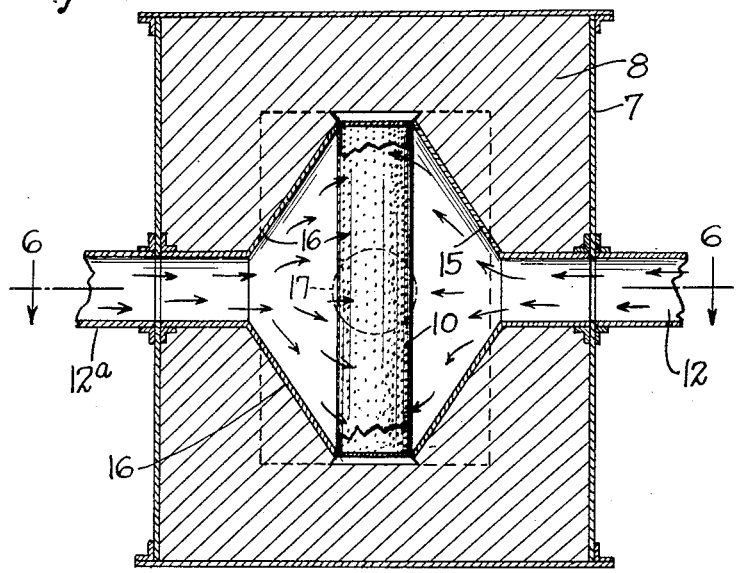
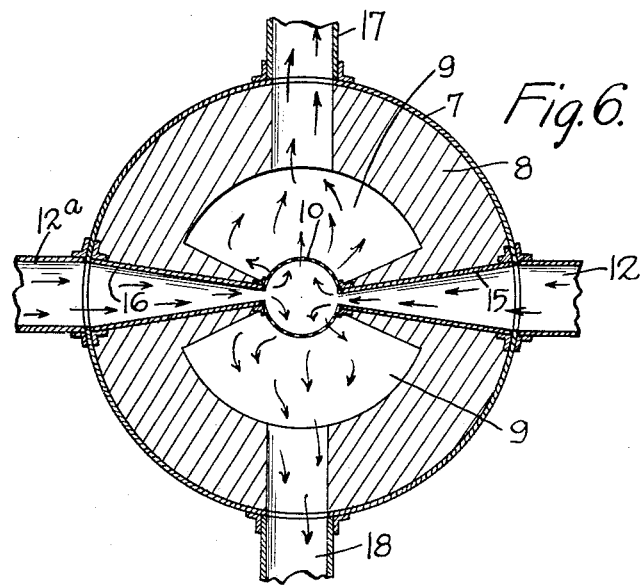
Inventor
CYRIL B. CLARK
By His Attorney
Philip C. Rich Patented Oct. 20, 1931

1,828,318

UNITED STATES PATENT OFFICE

CYRIL B. CLARK, OF SCARSDALE, NEW YORK, ASSIGNOR TO AMERICAN CYANAMID COMPANY, OF NEW YORK, N. Y., A CORPORATION OF MAINE

BURNER FOR THE OXIDATION OF AMMONIA

Application filed February 20, 1930. Serial No. 429,928.

My invention relates to improved apparatus for the oxidation of ammonia to form oxides of nitrogen for the production of nitric acid by the catalytic oxidation of ammonia in the burner, and more particularly includes a new and improved form of burner for such oxidation of ammonia having distinct advantages over the burners now in use for such purpose.

The burners commonly used have been of either the flat metallic gauze or the cylindrical types. In the former type the ammonia gas passes through the gauze in a direction perpendicular to the surface of the gauze which may be electrically heated; in the cylindrical gauze type the gas enters at one end of the cylinder, the opposite end being closed, and such gas passes outwardly through the peripheral sides of the gauze cylinder as in the U. S. Jones and Parsons Letters Patent No. 1,321,376 of November 11, 1919.

The ammonia oxidation reaction proceeds best at a temperature around 1000° C. Since the heat generated by the reaction will not raise the temperature of the gas to 1000° C. when operating with a 9% to 10% ammonia gas, heat must be supplied to such gas to obtain the optimum operating condition. This may be done either by supplying heat directly to the metallic gauze by electrical means, or by preheating the entering gas by heat interchange relation with the exit gases. To ensure high efficiency of conversion the ammonia must not be decomposed to any extent before reaction in the catalyst.

The disadvantage of using electrical heating is the extra power required for a process that should be self-supporting from a heat standpoint, provided the heat in the outgoing gas could be used for preheating the ingoing gas. But in preheating the gas, it is likely that ammonia will become decomposed to nitrogen to a considerable extent in the presence of heated surfaces and loss in yields would probably result.

In burners of the cylindrical gauze type that are closed at one end, direct heating of the gauze by heat radiating from the walls of the burner increases the temperature of the gauze and allows less preheating of the gas before catalytic oxidation, thereby lowering the decomposition of ammonia into nitrogen and so the yields are increased. This type of burner is, however, limited in size and shape, since a comparatively long cylinder is ineffective due to poor gas distribution, and furthermore the gas entering at one of the cylinder ends would pass along heated surfaces and so become decomposed. Hence it is impracticable to build large units or to secure the large heating by radiation that is obtainable in a long tube of relatively small diameter.

In my improved burner the temperature of the gases entering the burner are lower than heretofore used, and furthermore my burner also utilizes the effective areas surrounding the burner which areas radiate heat to the gauze to the fullest extent, whereby the yield of oxides of nitrogen for the production of nitric acid is increased.

In the drawings, Fig. 1 is a vertical section of an improved burner embodying one form of my invention;

Fig. 2 is a view on the line 2—2 of Fig. 1;

Fig. 3 is a vertical section of a burner embodying a modified form of the burner shown in Fig. 1;

Fig. 4 is a view on the line 4—4 of Fig. 3;

Fig. 5 is a vertical section of another modified form of my improved burner; and Fig. 6 is a view on the line 6—6 of Fig. 5.

Similar numerals refer to similar parts throughout the several figures.

Referring to Figs. 1 and 2, the cylindrical burner shell 7 is built with refractory lining 8 formed of bricks or other suitable refractory material to provide a central core 9, the inner surface of the lining 8 preferably being concentric with the axis of the burner 7 as shown in Fig. 2. Concentrically disposed within the core 9 is the metallic gauze 10, preferably composed of platinum or a suitable alloy containing platinum, and made in the form of a closed-ended cylinder of considerable length, at least twice as long as its diameter as shown in Figs. 1 and 2. This gauze cylinder 10 may also be formed of any of the alloys heretofore proposed as catalysts in this reaction. Such gauze cylinder 10 is closed at both ends and is mounted on the inner end of the fan-shaped distributing box 11 set in the lining 8, the outer end of the box 11 being mounted on the ammonia gas inlet 12. The gas outlet 13 is located in the burner shell 7 opposite to the inlet 12.

In operation the ammonia gas enters through the inlet 12 as shown by arrows, and then is evenly distributed in the box 11 before it passes at right angles to and through the surface of the gauze cylinder 10 as indicated by arrows, and is discharged from the burner through the outlet 13. As shown diagrammatically by the arrows, the method of introducing the gas to the gauze cylinder 10 permits a gauze of any length and capacity being used without bringing the ammonia gas into contact with hot surfaces previous to its contact with the gauze 10, and the amount of heat radiated back from the lining 8 to the gauze 10 in my improved burner is approximately twice the amount of heat radiated from ordinary type of cylindrical burner hereinbefore mentioned.

In the modified form of burner shown in Figs. 3 and 4, the construction is substantially that shown in Figs. 1 and 2 respectively, except that in this modified form the gas-distributing box 11 contains one or more dividing walls 14 to aid in the equal distribution of the gas entering the box 11 from the inlet 12. Such walls 14 may be of any size or shape to best serve their purpose.

In the modified form of burner shown in Figs. 5 and 6, the gas enters the burner from the gas inlets 12 and 12ª through two oppositely-disposed distributing boxes 15 and 16 of the same form as the box 11 and then passes through the gauze cylinder 10 and escapes from the core 9 through two oppositely-disposed gas outlets 17 and 18.

In all forms of my improved burner as shown, it will be observed that the amount of heat radiated from the lining 8 is proportional to the area of the radiating surface. Hence my burner may be designed and built so that the areas of the mutually parallel surfaces of the lining 8 and gauze cylinder 10 may be proportioned that a large amount of radiant heat can be concentrated on a small area either for absorption or reflection, since this ratio between such parallel surfaces chiefly controls the amount of heat radiated back to the gauze cylinder 10 from the lining 8.

In normal operation, I believe the temperature of the inside of the walls of the lining 8 is substantially the same as the outer surface of the gauze cylinder 10, and that the inner surface of the gauze 10 is at a lower temperature. Therefore in my improved burner the large supply of radiant and reflected heat at the outer surface of the gauze 10 is continuously conducted by and through the gauze 10 towards its inner surface and thereby transferred to the cooler incoming gas. In other words the gas entering the gauze 10 at a lower temperature tends to cool such gauze 10 on its inner surfaces and abstract heat by conductance from the outside.

Since the heat generated in this reaction is in the gas itself, such gas must be at a higher temperature than the gauze 10. According to my theory the heat generated at the outer surface of the gauze 10 may raise the inner surfaces of the lining 8 to a temperature higher than the outer surface of the gauze. Irrespective of these beliefs as to the operating conditions within the burner, my improved type permits a lower temperature for the ammonia gas entering the burner and so increases the yield of oxides of nitrogen ultimately obtained due to the catalytic oxidation of the ammonia therein.

It will be observed from the drawings that my improved burner embodies a metallic gauze cylinder 10 closed at both ends and having its length at least twice its diameter with means for presenting the ammonia gas to such cylinder so that such gas is evenly distributed and then enters the cylinder 10 at right angles to the axis of the cylinder. Such ammonia gas does not pass along heated surfaces to any extent before contacting with the heated gauze 10 for the catalytic reaction and so the liklihood of ammonia decomposition is reduced to a minimum. Other parts of the apparatus forming my burner may be changed in details so long as the essential structural features I have shown and described are preserved.

I claim as my invention:—

1. A burner for the oxidation of ammonia comprising a catalyst in the form of a hollow gauze cylinder and means for passing the ammonia gas into the inner chamber of the cylinder at right angles to its axis.

2. A burner for the oxidation of ammonia comprising a catalyst in the form of a hollow gauze cylinder closed at both ends and means for passing the ammonia gas into the inner chamber of the cylinder at right angles to its axis.

3. A burner for the oxidation of ammonia comprising a catalyst in the form of a hollow gauze cylinder having its length at least twice its diameter and means for passing the ammonia gas through the sidewalls of the cylinder and at right angles to its axis into the inner chamber of the cylinder.

4. A burner for the oxidation of ammonia comprising a catalyst in the form of a hollow gauze cylinder closed at both ends and having its length at least twice its diameter, and means for passing the ammonia gas through the sidewalls of the cylinder and at right angles to its axis into the inner chamber of the cylinder.

5. A burner for the oxidation of ammonia comprising a catalyst in the form of a hollow gauze cylinder and means for passing the ammonia gas into the inner chamber of the cylinder at right angles to its axis and throughout its length.

6. A burner for the oxidation of ammonia comprising a catalyst in the form of a hollow gauze cylinder, means for passing the ammonia gas through the sidewalls of the cylinder and at right angles to its axis into the inner chamber of the cylinder, and means for equalizing the flow of said gas through said cylinder sidewalls.

7. A burner for the oxidation of ammonia having in combination a catalyst in the form of a hollow gauze cylinder and heat radiating surfaces concentrically disposed only about the gauze sidewalls of said cylinder throughout its length.

8. A burner for the oxidation of ammonia having in combination a catalyst in the form of a hollow gauze cylinder closed at both ends and having its length at least twice its diameter and heat radiating surfaces concentrically disposed only about the gauze sidewalls of said cylinder throughout its length.

9. A burner for the oxidation of ammonia having in combination a catalyst in the form of a hollow gauze cylinder, heat radiating surfaces concentrically disposed only about the gauze side walls of said cylinder throughout its length, and means for passing the ammonia gas sidewise into the inner chamber of the cylinder.

10. A burner for the oxidation of ammonia having in combination a catalyst in the form of a hollow gauze cylinder, heat radiating surfaces concentrically disposed about the cylinder throughout its length, and means for passing the ammonia gas into the inner chamber of the cylinder at right angles to its axis and throughout its length.

11. A burner for the oxidation of ammonia comprising a catalyst in the form of a hollow gauze cylinder and separate means for passing the ammonia gas at right angles to its axis into its inner chamber through oppositely-disposed surfaces of the cylinder.

12. A burner for the oxidation of ammonia comprising a catalyst in the form of a hollow gauze cylinder and separate means for passing the ammonia gas into its inner chamber through oppositely-disposed surfaces of the cylinder and at right angles to its axis.

13. A burner for the oxidation of ammonia comprising a catalyst in the form of a hollow gauze cylinder closed at both ends and having its length at least twice its diameter, and separate means for passing the ammonia gas at right angles to its axis into its inner chamber through oppositely-disposed surfaces of the cylinder substantially throughout its length.

14. A burner for the oxidation of ammonia comprising a catalyst in the form of a hollow gauze cylinder closed at both ends and having its length at least twice its diameter, and separate means for passing the ammonia gas into its inner chamber through oppositely-disposed surfaces of the cylinder and at right angles to its axis.

15. A burner for the oxidation of ammonia having in combination a catalyst in the form of a hollow gauze cylinder with its length at least twice its diameter, heat radiating surfaces concentrically disposed about the cylinder throughout its length, and separate means for passing the ammonia gas into its inner chamber through oppositely-disposed surfaces of the cylinder and at right angles to its axis throughout its length.

16. A burner for the oxidation of ammonia comprising a catalyst in the form of a hollow gauze cylinder and a gas-distributing box for passing the ammonia gas into the inner chamber of the cylinder at right angles to its axis and throughout its length in parallelism with its axis.

17. A burner for the oxidation of ammonia comprising a catalyst in the form of a hollow gauze cylinder, a gas-distributing box for passing the ammonia gas into the inner chamber of the cylinder at right angles to its axis and throughout its length in parallelism with its axis, and means within the box for distributing the gas flow evenly before passing same into the inner chamber of the cylinder.

CYRIL B. CLARK.